United States Patent

[11] 3,537,369

[72] Inventor Vernon D. Estes
Penrose, Colorado 81240
[21] Appl. No. 534,968
[22] Filed May 7, 1966
[45] Patented Nov. 3, 1970

[54] MODEL ROCKET CAMERA
13 Claims, 11 Drawing Figs.
[52] U.S. Cl. .................................................. 95/12.5
[51] Int. Cl. ............................................ G03b 29/00
[50] Field of Search .......................................... 95/12.5;
102/34.1, 34.4

[56] References Cited
UNITED STATES PATENTS
757,825 4/1904 Maul ............................. 95/12.5
1,490,239 4/1924 Taylor .......................... 95/12.5

FOREIGN PATENTS
10,118 5/1897 Great Britain ................ 95/12.5

Primary Examiner—John M. Horan
Attorney—Van Valkenburgh and Lowe

ABSTRACT: A model rocket camera in which a light weight cylindrical tube has a rocket propulsion motor attached to one end and the rear end of a tubular camera at its other end. The front end of the camera is provided with a lens and a shutter that is held in a position in which it is biased to move from a first closed position through an open position to a second closed position. The tube has attached to it a folded parachute and contains an ejection charge that is ignited after a predetermined time that is calculated to permit the rocket to reach its zenith by detonation of the propulsion charge and reverse its direction. Firing of the ejection charge ejects the camera from the tube and releases the camera shutter.

Patented Nov. 3, 1970

INVENTOR.
VERNON D. ESTES

Patented Nov. 3, 1970
3,537,369
Sheet 2 of 3
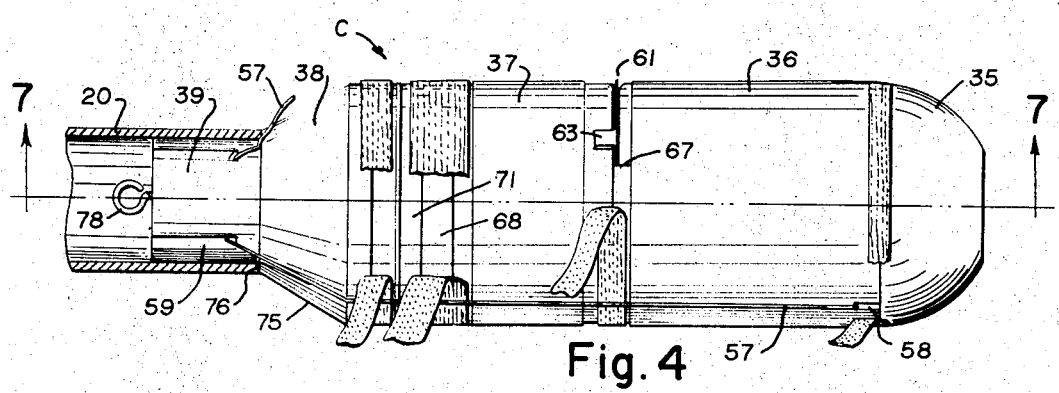
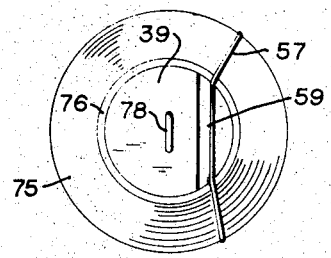
Fig. 5
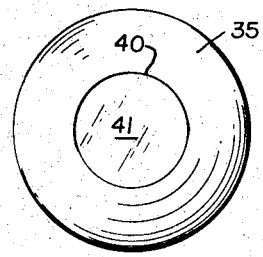
Fig. 6
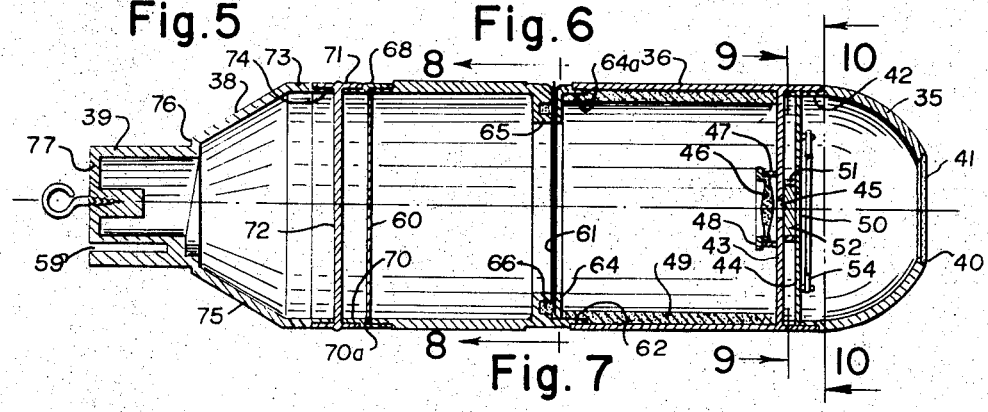
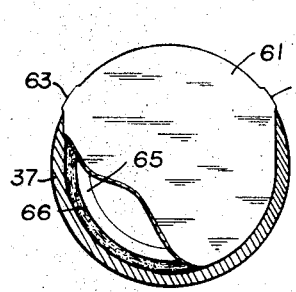
Fig. 8
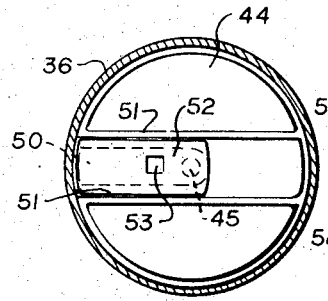
Fig. 9
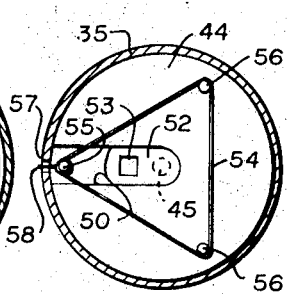
Fig. 10
INVENTOR.
VERNON D. ESTES 3,537,369

MODEL ROCKET CAMERA

This invention relates to cameras, and more particularly to small and miniature accessory cameras for model vehicles of a type which are adapted to take a picture while the model vehicle is in motion. The invention embodies an improved camera which is especially adapted for use with model rockets, with its operation being correlated with the operation of a model rocket. Accordingly, the camera will be hereinafter referred to as a model rocket camera.

The flying of model rockets by amateur rocketeers has become a popular pastime throughout the country, and this has led to the development of many types of model rockets and accessories therefor. However, because of safety considerations, this field of amateur model rocketry has necessarily been limited to small, lightweight units and to the use of standard types of manufactured motors. The model rocket camera is adapted to be used with a common type of model rocket that is built as a lightweight, tubular structure, a common size being approximately ¾ inches in diameter and from 6 to 12 inches long. To propel rockets of this type, a pyropulsive motor has been made available, which is formed as a short, cylindrical tube adapted to fit in the base or trailing end of the model rocket. This motor carries a fuel charge adapted to be ejected as a sustained, high velocity jet of gas from its trailing end with sufficient power to loft a lightweight rocket several hundred feet in the air.

In the upflight, it is desirable to have the model rocket as aerodynamically efficient as possible to produce a minimum air resistance to the driving force of the motor. However, as the model rocket returns to earth, it is desirable and even essential to break up this aerodynamic balance to produce as much drag as possible to reduce the speed of the model so that it will not be damaged upon impact with the ground. It is also often desirable to provide a parachute so the model rocket will float slowly to the earth. Accordingly, the model rocket motors are usually designed to provide power or an impulse which may be used to either modify the balance of the rocket or to eject a parachute after its driving fuel charge burns out. To accomplish this, a delay charge and explosive ejection charge are located in the leading end of the motor. This ejection charge, causing a small explosion at the leading end of the motor and into the body of the rocket, may be used to separate portions of the rocket body and eject the parachute or the like, and is advantageously used to actuate a model rocket camera, as will be hereinafter described.

Such model rockets are often adapted to carry various payloads and while it has been recognized that a very desirable payload would be a camera which could take an aerial photograph, conventional types of cameras commonly available are comparatively heavy, bulky and expensive and cannot be adapted for use in small model rockets. Moreover, ordinary control systems for operating the shutters of a conventional camera are simply not suitable for taking a picture when a model rocket is at the peak of its flight, several hundred feet above the ground.

With these considerations in view, the present invention was conceived and developed, and comprises, in essence, a model rocket camera formed within a lightweight, cylindrical, tubelike member adapted to be attached to the model rocket body to form a continuation of the body of the rocket. This camera includes an improved, simplified shutter system which is operated by a trigger extended to the connection of the camera with the rocket body to be actuated to actuate the shutter when the rocket motor in the trailing end of the unit fires its ejection charge. Other various necessary components normally found in a conventional camera are also provided in a simplified lightweight form.

It follows that an object of the invention is to provide a novel and improved camera for attachment to a model rocket which is a lightweight, cylindrical unit adapted to be mounted at the leading end of a model rocket body.

Another object of the invention is to provide a novel and improved model rocket camera which has a shutter actuating means adapted to operate responsive to the firing of an ejection charge of a rocket motor, and after the rocket terminates its upward flight and commences its return to the earth, and to thereby obtain an aerial photograph at a maximum height of the rocket flight.

Another object of the invention is to provide a novel and improved camera for a model rocket which is constructed as a lightweight, aerodynamically balanced unit which is especially adapted to be used with a standard size, tubular model rocket, but may also be adapted to be used with other model vehicles with only slight modifications to its structure.

Another object of the invention is to provide a novel and improved model rocket camera which incorporates a simple, but reliable shutter and lens system, and is capable of taking clear, good quality aerial photographs at a substantial height above the ground.

Another object of the invention is to provide a novel and improved model rocket camera which may be furnished as a kit of knocked-down parts, which may be subsequently assembled into a well-formed, reliably operative unit without the necessity of special tools or skills, and is an excellent unit for use in various educational and manual training projects.

Further objects of the invention are to provide a novel and improved model rocket camera which is a low-cost, neat-appearing, simple and rugged unit, which is easy to load and unload and may be used repeatedly without special maintenance or care.

With the foregoing and other objects in view, all of which more fully hereinafter appear, my invention comprises certain constructions, combinations and arrangements of parts and elements as hereinafter described, defined in the appended claims and illustrated in preferred embodiments in the accompanying drawing, in which:

FIG. 1 is a longitudinal sectional view through the body of a conventional type of a model rocket, including a motor mounted in the trailing end of its body, a folded parachute within the body and the improved rocket camera at the leading end, the assembly, as illustrated, being ready for a flight.

FIG. 2 is a small-scale, diagrammatic sketch wherein broken lines indicate the flight path of a model rocket as it completes its upward movement and commences to return to the earth, the FIG. illustrating the model as it would appear at various positions along this flight path; first, when it is flying upwardly, then after it passes the apogee of its flight and commences to fall at that instant when the camera and rocket body commence to separate responsive to the firing of the ejection charge of the motor; and finally, as the separated components are floating to earth by a parachute.

FIG. 4 is a longitudinal view showing a fragment of the forward end of the rocket in section and the camera in full, similar to FIG. 1, but on an enlarged scale, and with fragments of tape bindings about the camera being partially unwrapped to better illustrate the manner in which the components of the unit are held together.

FIG. 5 is a view of the trailing end of the camera.

FIG. 6 is a view of the leading end of the camera.

FIG. 7 is a longitudinal sectional view of the camera per se, as taken from the indicated line 7-7 at FIG. 4.

FIG. 8 is a transverse sectional view as taken from the indicated line 8-8 at FIG. 7, but with a portion of the cover plate being removed to show parts otherwise hidden from view.

FIG. 9 is a transverse sectional view as taken from the indicated line 9-9 at FIG. 7.

FIG. 10 is a transverse sectional view as taken from the indicated line 10-10 at FIG. 7.

Figure 1:
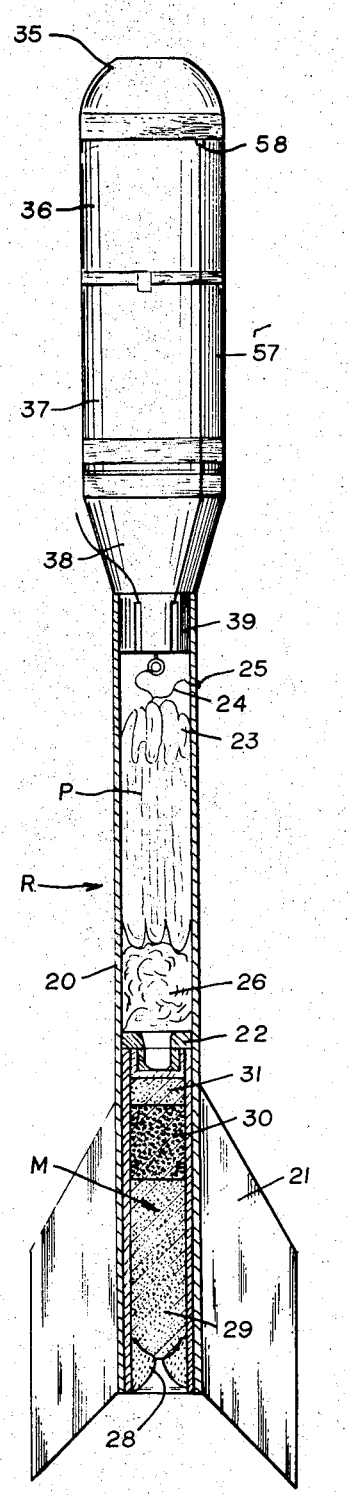

Referring more particularly to the drawing, the model rocket R, illustrated at FIG. 1, is exemplary of a unit which is especially suitable for carrying the novel, tubular rocket camera C. The body 20 of the rocket is formed as an elongated, lightweight tube of cardboard or like material. External guide fins 21 are mounted at the trailing end of this tube 20 to provide aerodynamic stability to the unit during flight. The trailing end of this tube also forms a natural socket for a cylindrical rocket motor M, and an abutment ring 22 is glued or otherwise secured within this tube 20 at a selected distance from its trailing end to properly hold the rocket motor M within the tube. The leading end of the tube provides a compartment, wherein a lightweight parachute P may be folded and positioned, with the shroud lines 23 being connected to a holding line 25 which, in turn, is secured to the wall of the tube, as at 25. A wadding 26 is placed in the base of this compartment, between the parachute and the rocket motor. The camera C, a lightweight, cylindrical unit, as will be hereinafter described, is frictionally mounted in the leading end of the tube, to extend forwardly thereof and provide an aerodynamically balanced leading member of the model rocket.

The motor M is a short, cylindrical, tubular shell 27 having a discharge nozzle 28 at its trailing end. This motor is loaded with three sequential burning charges. These include, first, a pyropulsive driving charge 29 which, when ignited at the nozzle in any suitable manner, burns and ejects a high velocity jet of gas from the nozzle. A second charge, a delay charge 30, is positioned forwardly of the driving charge and is of a slow burning powder or like material adapted to provide a selected time delay period before it burns through. The third, an ejection charge 31, is positioned forwardly of this delay charge and at the leading end of the motor. When the delay charge burns through to ignite the ejection charge, a sudden generation of gas pressure is directed forwardly into the compartment within the tubular body 20 with sufficient force as to separate the camera C from the leading end of the rocket body and to eject the parachute P. The wadding 26 between the motor and the parachute P prevents the ejection charge from burning the parachute.

Figure 2:
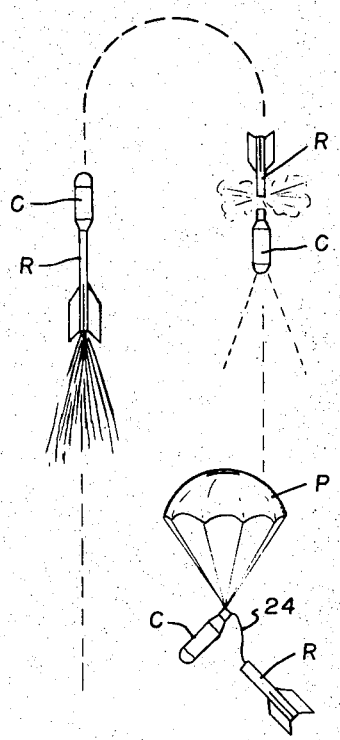
Figure 3:
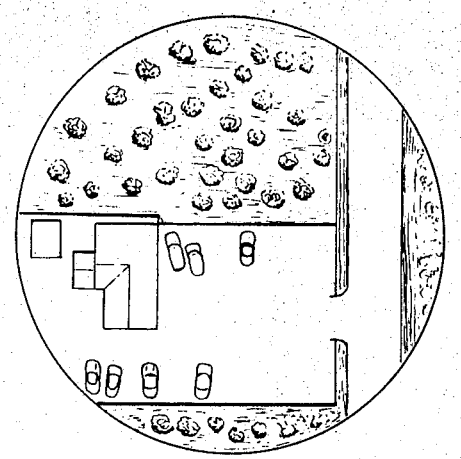
FIG. 3 illustrates a typical aerial photograph taken by a camera.
Figure 11:
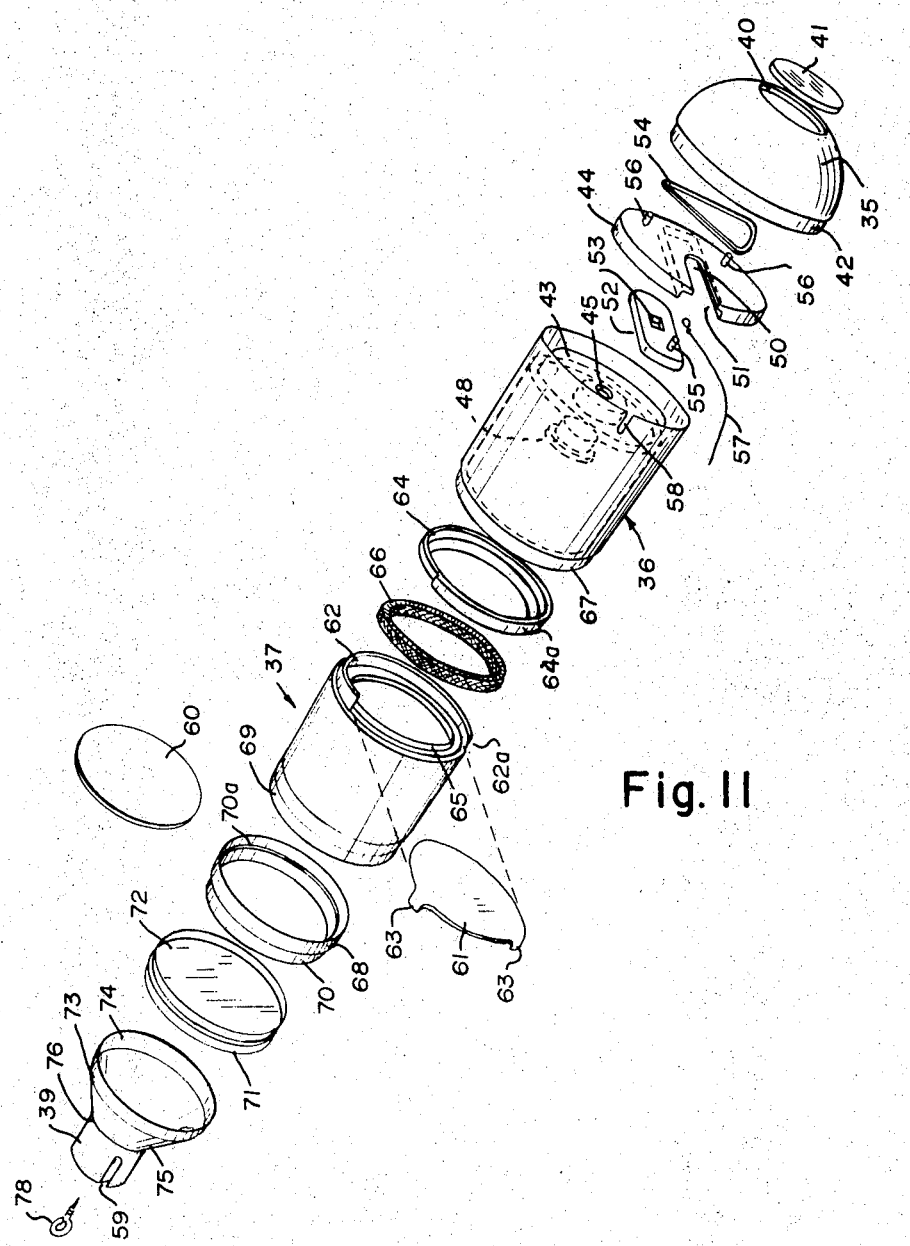
FIG. 11 is an exploded perspective view of the camera illustrating the individual components thereof.

The timing of these respective charges in the motor M is selected to first permit a sequence of operations, diagrammatically illustrated along a flight path at FIG. 2. First, the rocket R is lofted to a substantial height before the driving charge 29 burns out. Next, the delay charge 30 burns for a period of time sufficient to permit the rocket to coast to its apogee and commence its return fall to the earth. The aerodynamic form of the rocket will cause the rocket to tip as it changes its direction of flight, with the leading nose of the rocket pointing downwardly. Then, the ejection charge is ignited to separate the camera from the rocket, actuate the camera shutter and eject the parachute P to permit the apparatus to float to the earth without being damaged.

The camera C is formed as an array of axially symmetrical, lightweight, tubular, interlocking sections, including a dome-shaped leading nose cone 35, a tubular lens section 36 behind the nose cone, a similar tubular film compartment 37 behind the lens section and a frustoconical adaptor 38 behind the film compartment which terminates as a stub 39 adapted to fit into the leading end of the tubular rocket body 20. Each of these sections is a thin-wall, lightweight shell, with some having reduced diameter lips or ends for snug socket-fit connection with ends of others, as will be further described. These components are preferably manufactured from a thermoplastic, synthetic resin material, such as high impact styrene, by injection molding or by any similar procedure which provides accurately formed, close fitting members. Being a camera, it is preferable to have the components colored black to eliminate chances of stray or reflected light improperly exposing a film within it.

The dome-shaped nose cone 35 includes an axially centered, circular opening 40 at its apex, the leading end of the camera, wherein a circular window 41 is fitted. The rearward edge, that is, the base of the dome, terminates as a short, instepped connector ring lip 42 which fits into the leading end of the tubular lens compartment, so that the outer surface of the nose cone smoothly merges with the outer cylindrical surface of the lens section 36.

The lens section 36 is a tubular, thin-wall member having a length which may be slightly greater than its diameter. A transversely disposed bulkhead 43 is located a short distance rearwardly of the leading edge of this member, with the spacing from the leading edge being sufficient to accommodate a disc-shaped shutter carrier 44 sized to lie snugly within the cylindrical member 36 against the bulkhead 43, with its peripheral edges being held in place by the lip 42 of the nose cone 35, as clearly illustrated at FIG. 7. The bulkhead includes a circular light passage aperture 45 at its axial center, and a lens 46 is mounted within the lens section behind the aperture. This lens is held in a short, cylindrical support ring 47 outstanding from the rearward wall of the bulkhead 43, about the aperture. To facilitate precise positioning of the lens within this ring, the lens 46, made of a clear plastic resin, is preferably formed as a molded, cup-shaped member, with the lens proper forming the bottom of the cup and the walls being an angle flange 48 about the lens, fitting snugly into the ring 47, either with a frictional fit or by gluing it into place. To complete the interior of the lens section 36 rearwardly of the bulkhead, the inner cylindrical wall is cased with a thin layer 49 of a resilient foam-like material which effectively absorbs any stray light which may accidentally enter this section through the lens, or otherwise.

The shutter carrier 44, a flat, disc-shaped member, includes the radial slot 50 at one side thereof which extends to and about the center of the unit to overlie the aperture 45 and has a width and curve greater than the diameter of the aperture to prevent interference with the light passing through the aperture. The carrier is also formed with a flat, rectangular, diametrically extended groove 51 between the slot and the bulkhead, wherein a shutter 52 is mounted. This shutter 52 is formed as a simple rectangular block slidably fitted into the groove having a length somewhat greater than the radius of the carrier, so that it may move within the groove from a first position at one side of the carrier, as over the slot 50 where one end of the shutter overlaps and closes the aperture 45, and to a second position at the other side of the carrier, where the other end of the shutter overlaps and closes the aperture. A square orifice 53 is formed at the center of this shutter, so that movement from the first position to the second position causes the orifice 53 to cross the aperture 45 and provide a momentary light exposure through the aperture and into the lens section and into the film compartment, when the film is to be exposed.

The shutter 52 is actuated by a simple spring arrangement consisting of a rubber band 54 which pulls against a post 55 upstanding from that end of the shutter exposed to the slot, the post extending through the slot to the forward surface of the carrier disc 44 to move within the slot 50, as the shutter moves in the groove. A pair of spaced anchor posts 56 outstand from the forward surface of the carrier disc at corners opposite the slot position to provide a triangular, tensed arrangement of the rubber band between these anchor posts and the shutter posts.

This shutter 52 is cocked by pulling the shutter post 55 to the edge of the section wall at the above described first position by a string 57 connected to the shutter post 55 and extending outwardly from the lens section 36 through a narrow slot 58 at the leading edge of the section. The string 57 is adapted to be extended rearwardly along the outer wall of the lens section, the film compartment, and to a side slot 59 in the stub of the adaptor, where it is frictionally held in place under tension by mounting the adaptor to the end of the rocket tube 20. A sudden release of the string is effected by separation of the camera from the rocket tube, and this permits the shutter to snap from the first position to the second position, to bring the post 55 to the center of the carrier and with an exposure occurring when the orifice 50 moves past the aperture 45. Rubber bands of various sizes of uniform manufacture are available, and such bands form an exceedingly simple and surprisingly well timed spring system for the shutter. The factors of timing an exposure depends upon the weight of the shutter, the size of the aperture, the size of the orifice and the strength of the rubber band, all of which may be determined by simple calculations or trial exposure tests.

The film compartment 37 is a tubular, thin-wall shell having a length approximately the same as its diameter. It is adapted to hold a disc-shaped film 60 and is normally closed at each end to prevent access of light to the film, the closure at the forward end being a light lock slide 61, which is removed when the film is to be exposed to light by the shutter.

The front end of the compartment tube 37 includes a reduced diameter lip 62 adapted to snugly fit into the rear end of the lens section 36 to interconnect the members. However, one side of this lip is cut away, as at 62a, to receive the light lock slide 61. The slide 61 is a flat, thin, metallic plate adapted to be inserted into the side of the section, at the base of the lip, the slide being formed to fit within the tube, with one portion extending outwardly from the cutaway 62a, and having suitable finger catches 63 to facilitate removing it from its inserted position.

The slide is held in position in a socket formed at one side by an angle-shaped abutment ring 64 fitted within the forward portion of the lip 62. This ring 64 has an inturned flange whose rearward surface supports the forward face of the lock slide 61. Also, the sidewall of that portion of the ring 64 at the lip cutaway 62a is increased in thickness, as at 64a, to provide a continuous outer cylindrical surface at the lip to assure a snug fit into the end of the lens section 36. The other side of the socket is formed by an annular lip ring 65 extending inwardly from the inner wall of the compartment shell 37 immediately behind and adjacent to the flange of the abutment ring 64, with the spacing between the two being sufficient to snugly receive the slide 61. To further enhance the snugness of the fit of the slide between this ring 65 and the flange 64 an annular socket is provided in the ring, and a pad ring 66 of resilient material, such as felt, is mounted in the socket to normally bear against the rearward face of the slide but to contact the flange ring 64 whenever the light lock slide 61 is removed. To further provide a snug, tightly abutted fit of the lens section 36 and the film compartment 37 when they are interconnected, a segmented offset 67 is formed in the rear edge of the lens section which provides a slotlike clearance for removal of the light lock slide.

A narrow film holding ring 68 is connected to the rearward end of the compartment tube 37, the tube including a rearwardly extended lip 69 adapted to snugly fit within the film holding ring 68, so that the outer surfaces of the tube and the ring are of the same diameter. The ring 68 includes a rearwardly extended, reduced diameter lip 70 having a shoulder 70a within the ring, whereon the film disc 60 is seated. The film disc 60 is thus adapted to fit within the holder ring 68 against this shoulder 70a and with the rearward end of the lip 69 of the compartment tube extending into the ring and abutting against the film edge to snugly hold it in position.

The rear end of the film compartment is closed by a narrow cover ring 71 having a central, transverse diaphragm 72. This cover ring 71 is fitted upon the film ring lip 70 to complete the film holding compartment.

The adaptor 38 constituting the rear end of this camera C is formed as a thin-wall shell. It includes a narrow ring 73 having a diameter the same as the diameter of the cover ring of the lens compartment. A lip 74 extends forwardly of the ring 73 and is adapted to fit into the rearward end of the cover ring 71 to connect the two members together. A truncated cone 75 reduces the diameter of the adaptor to the diameter of the body tube 20 of the rocket R, whereon the camera will be mounted. The connector stub 39 extends rearwardly from the apex end of this truncated cone 75 to complete the adaptor. The diameter of the stub is smaller than the diameter of the end of the cone to form a shoulder 76 having a width approximately the thickness of the shell of the rocket body tube 20. This adaptor stub 39 includes the slot 59, heretofore mentioned, and a hole 77 at its rear end to receive a small eyelet 78 for connection of the unit with the string 25 connected to the rocket body.

In assembly of this unit, it is anticipated that the film compartment 37 will be first assembled as a unit, separate from the remainder of the camera components. This is to facilitate the loading and removal of film discs 60, which must be done in a dark environment. In actual use, it is convenient to have extra film compartments where a number of pictures are to be taken with the model rocket at any one time. In attaching the film holding ring 68 and the rear cover ring 71 to the film compartment shell 37, it is desirable to secure the rings together with a removable cellulose type mastic tape, such as Scotch Tape, at the connective points of the components. It is also desirable to interconnect the other components in the same manner. In order to provide as smooth an outer surface as possible, the diameter of the several rings and of the tubes 36 and 37 adjacent to the connecting sections may be slightly reduced to compensate for the thickness of the tape. The connection of the nose cone to the shutter compartment may be likewise or it may also be of a more permanent nature, since removal of the nose cone to replace the rubber band 54 or a frayed string 57, or to clean the windows and lens, will be much less frequent than disconnection of the film compartment from the shutter section.

Operation of the unit is a simple matter. The film holding ring 68 is first separated from the film compartment tube 37 in a darkroom and is loaded with a film disc 60. Next, the lens section 36 and the adaptor 38 are connected to the assembled, closed film compartment 37. Next, the camera is attached to the string 25 and is mounted upon a model rocket R loaded with a motor and a parachute. In mounting the camera upon the rocket, the string 57 is pulled to place the shutter in the "on" position, the shutter string being threaded through the slot 56 in the adaptor stub 39 and held under tension until the adaptor stub is fully inserted into the body of the rocket. A rocket body 20 is necessarily sized so that the fit with the camera stub 39 will be snug and will hold the string 57 in place. However, if necessary, short lengths of tape may be placed in the end of the rocket body to produce the necessary snug fit. With the unit prepared for flight, as in the manner illustrated at FIG. 1, the final step is to remove the light cover plate 61, so that action of the shutter will permit the film to be exposed. Upon termination of a flight, the light cover plate 61 is reinserted and the film holding section removed from the other sections and thence to a darkroom where the film may be developed.

I have now described my invention in considerable detail; however, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. In combination, a rocket vehicle adapted to be driven by a motor of a type having a pyropropulsive charge ejected from the trailing end of the rocket vehicle; a camera releasably mounted upon the forward end of said rocket vehicle, with its lens directed forwardly with respect to the direction of travel of said rocket vehicle, a forwardly directed ejection charge contained within said rocket vehicle and located so that when ignited said camera is ejected from said rocket vehicle; means to ignite said ejection charge at a predetermined period of time after the driving charge is expended and the rocket vehicle passes its apogee and has reversed its direction of forward travel; said camera having a shutter and a shutter operating means adapted to be biased to cock the shutter and be released from the bias to operate said shutter; and means associated with said rocket vehicle adapted to hold said shutter operating means at its biased position and to release the same from the biased position; means responsive to the ignition of said forwardly directed ejection charge to effect ejection of said camera from said holding means; and means responsive to the ignition of said forwardly directed ejection charge for effecting simultaneously with the release of said camera from said holding means the release of said shutter operating means from its biased position.

2. In combination, a camera adapted to be mounted upon the forward end of a rocket vehicle adapted to be driven by a motor of the type having a pyropropulsive charge ejected from the trailing end of the rocket and including a forwardly directed ejection charge to disconnect the camera from the rocket which actuates after the driving charge is expended and the rocket passes its apogee and commences to fall, said camera having a shutter and a shutter-operating means adapted to be biased to cock the shutter and to be released from the bias to operate the shutter, and means associated with the vehicle adapted to hold the shutter operating means at its biased position responsive to the operation of the forwardly directed ejection charge of the model vehicle's motor and as the camera is disconnected from the rocket, said rocket and said camera being formed as generally cylindrical members, the camera having a tubular stub adapted to be slidably inserted into the leading end of the rocket body with a moderate frictional fit sufficient to hold the camera in place upon the tube in normal flight, but to be separated from the rocket tube by action of the ejection charge.

3. In the organization set forth in claim 2, wherein said shutter actuating means is associated with the rocket body tube to be biased when the camera is inserted into the tube and to be released when the camera is ejected from the tube.

4. In the combination set forth in claim 2, wherein the camera shutter is spring loaded, and has a pull string attached thereto, said string being adapted to be pulled to bias the shutter and adapted to be held against the said stub when the stub is inserted into the rocket body while pulling the shutter, and to be released when the camera is separated from the rocket vehicle.

5. In the combination set forth in claim 2, including a connecting string adapted to hold the camera and rocket body after separation and a folded parachute within the rocket body adapted to be ejected upon separation of the camera from the rocket body to thereby open and restrict the speed of fall of the members to the ground.

6. In the organization set forth in claim 1, wherein said camera is formed generally as a hollow structure, and including:
   a. a leading nose cone having an optic opening therein;
   b. a lens section optically cooperating with the opening, including a transverse bulkhead wall with an aperture therethrough and a resiliently biased shutter traversing the aperture adapted to normally close the aperture and to be moved from a first position to a biased position and to return to the first position when released and to momentarily open and again close the aperture;
   c. a closed film retaining compartment extending rearwardly from the lens section as a continuation thereof, with said stub being rearwardly of the film retaining compartment; and
   d. a shutter actuating means connected to the shutter and adapted to be held by the vehicle and tensed to cock the shutter to its biased position, but to be released responsive to reparation of the camera from the rocket body.

7. The camera defined in claim 6, wherein said components are interlocked by a lip at the end of one component snugly fitting into the end of another component.

8. The camera defined in claim 6, wherein said lens is mounted upon the bulkhead wall and said mounting includes a support ring outstanding from the bulkhead about the aperture adapted to receive the lens, and a side flange about the lens adapted to snugly fit within the ring.

9. The camera defined in claim 6, wherein said shutter means includes a carrier disc adapted to be mounted against the bulkhead wall having an opening therethrough adapted to permit uninterrupted passage of light from the window and through the aperture, a diametrical groove in the disc, a shutter block within the groove having an orifice at its center and a length such that it may be moved to one side of the disc, with one end thereof covering the aperture, and to the other side of the disc, with the other end thereof covering the aperture, and with the orifice registering with the aperture during such movement, and resilient means adapted to urge the slide to one side of the disc.

10. A rocket vehicle, a camera adapted to be mounted upon said rocket vehicle for ejection therefrom at a selected phase of said rocket vehicle travel, said camera having a shutter and a shutter operating means adapted to be biased to cock the shutter and to be released from the bias to operate the shutter;
   a holding means associated with the rocket vehicle adapted to hold the camera and the shutter operating means at its biased position when mounted upon the vehicle; and
   ejecting means associated with the rocket vehicle, operative at said selected phase of travel of the rocket vehicle to eject the camera from the holding means and rocket vehicle and simultaneously therewith release the shutter from its bias to operate the camera.

11. In the combination defined in claim 10 wherein said rocket vehicle is an airborne rocket and said ejecting means is designed to operate after the rocket passes its apogee of flight.

12. In the combination defined in claim 10 wherein said rocket vehicle is a tubular rocket having a pyropulsive type motor at the trailing end thereof to eject a driving charge therefrom and said holding means carries the camera at the forward end of the rocket vehicle; said ejecting means consists of a delay means and a forwardly directed ejection charge designed to be actuated a short period of time after the driving charge is expended and the rocket passes its apogee of flight and commences to fall, said camera having its lens directed forwardly whereby to take a picture of the ground below the instant the camera is separated from the rocket vehicle and the shutter is operated.

13. In combination, a camera detachably mounted upon the forward end of a rocket vehicle adapted to be driven by a motor of a type having a pyropulsive charge ejected from the trailing end of a rocket vehicle, an ejection charge at the forward end of the rocket vehicle, and means for actuating said ejection charge after the driving charge is expended, the rocket vehicle passes its apogee of flight and commences to fall;
   said camera having a shutter and a shutter operating means adapted to be biased to cock the shutter and to be released from the bias to operate the shutter; and
   means associated with the rocket vehicle adapted to hold the shutter operating means to its biased position and to release the same from the biased position responsive to and substantially simultaneously with the operation of said ejection charge.